United States Patent [19]
Bartlett et al.

[11] Patent Number: 5,409,962
[45] Date of Patent: * Apr. 25, 1995

[54] SUBSTANTIALLY CONSTANT BOILING BLOWING AGENT COMPOSITIONS OF 1,1,1,2-TETRAFLUOROETHANE AND DIMETHYL ETHER

[75] Inventors: Philip L. Bartlett; Joseph A. Creazzo, both of Wilmington, Del.

[73] Assignee: E. I. Du Pont de Nemours and Company, Wilmington, Del.

[*] Notice: The portion of the term of this patent subsequent to Dec. 16, 2008 has been disclaimed.

[21] Appl. No.: 809,153

[22] Filed: Dec. 16, 1991

Related U.S. Application Data

[60] Continuation-in-part of Ser. No. 723,112, Jun. 28, 1991, abandoned, which is a division of Ser. No. 492,963, Mar. 12, 1990, abandoned.

[51] Int. Cl.⁶ .............................. C08J 9/14; C09K 3/30
[52] U.S. Cl. ........................................ 521/88; 252/171; 252/305; 252/DIG. 9; 264/54; 264/DIG. 5; 424/45; 521/98; 521/114; 521/131; 521/146; 521/154; 521/155; 521/910
[58] Field of Search ......... 252/170, 171, 305, DIG. 9; 264/54, DIG. 5; 521/98, 131, 910, 88, 114, 146, 154, 155; 424/45

[56] References Cited

U.S. PATENT DOCUMENTS

| | | | |
|---|---|---|---|
| 3,607,755 | 9/1971 | Murphy | 252/67 |
| 3,922,228 | 11/1975 | Hutchinson | 252/67 |
| 4,002,573 | 1/1977 | Hutchinson | 252/171 |
| 4,062,795 | 12/1977 | Hutchinson | 252/171 |
| 4,226,976 | 10/1980 | Goodman | 528/498 |
| 4,428,854 | 1/1984 | Enjo et al. | 252/69 |
| 4,482,465 | 11/1984 | Gray | 252/67 |
| 4,543,202 | 9/1985 | Bartlett et al. | 252/305 |
| 4,585,577 | 4/1986 | Bartlett et al. | 252/305 |
| 4,771,080 | 9/1988 | Ibuki et al. | 521/56 |
| 4,783,276 | 11/1988 | Bohnenn | 252/64 |
| 4,810,316 | 3/1989 | Wakabayashi et al. | 156/78 |
| 4,975,212 | 12/1990 | Thomas et al. | 252/54 |
| 5,006,568 | 4/1991 | Fukazawa et al | 521/98 |
| 5,225,183 | 7/1993 | Purewal et al. | 424/45 |

FOREIGN PATENT DOCUMENTS 3077821 4/1991 Japan.

*Primary Examiner*—Linda Skaling
*Attorney, Agent, or Firm*—Michael K. Boyer

[57] ABSTRACT

Substantially constant boiling blowing agent compositions of 1,1,1,2-tetrafluoroethane and dimethyl ether.

4 Claims, No Drawings

SUBSTANTIALLY CONSTANT BOILING BLOWING AGENT COMPOSITIONS OF 1,1,1,2-TETRAFLUOROETHANE AND DIMETHYL ETHER

CROSS-REFERENCE TO RELATED APPLICATIONS

This application is a continuation-in-part of application Ser. No. 07/723,112, filed Jun. 28, 1991, abandoned, which, in turn, is a divisional of application Ser. No. 07/492,963, filed Mar. 12, 1990, abandoned.

BACKGROUND OF THE INVENTION

This invention relates to mixtures of 1,1,1,2-tetrafluoroethane (HFC-134a) and dimethyl ether (DME). Such mixtures are useful as refigerants, heat transfer media, gaseous dielectrics, foam expansion agents, aerosol propellants and power cycle working fluids. These mixtures are potentially environmentally safe substitutes for dichlorodifluoromethane (CFC-12), which is a large volume commercial refrigerant.

Closed-cell polyurethane foams are widely used for insulation purposes in building construction and in the manufacture of energy efficient electrical appliances. In the construction industry, polyurethane (polyisocyanurate) board stock is used in roofing and siding for its insulation and load-carrying capabilities. Poured and sprayed polyurethane foams are widely used for insulating large structures such as storage tanks, etc. Pour-in-place polyurethane foams are used, for example, in appliances such as refrigerators and freezers plus they are used in making refrigerated trucks and railcars.

All of these various types of polyurethane foams require expansion agents (blowing agents) for their manufacture. Insulating foams depend on the use of halocarbon blowing agents, not only to foam the polymer, but primarily for their low vapor thermal conductivity, a very important characteristics for insulation value. Historically, polyurethane foams are made with CFC-11 (CFCl$_3$) as the primary blowing agent.

A second important type of insulating foam is phenolic foam. These foams, which have very attractive flammability characteristics, are generally made with CFC-11 and CFC-113 (1,1,2-trichloro-1,2,2-trifluoroethane) blowing agents.

A third type of insulating foam is thermoplastic foam, primarily polystyrene foam. Polyolefin foams (polyethylene and polypropylene) are widely used in packaging. These thermoplastic foams are generally made with CFC-12.

Many products designed for household, personal or industrial use are available as aerosol products. Typical examples of such products and ones in which the propellant system of the present invention can be used included personal products such as hair sprays, deodorants and colognes; household products such as waxes, polishes, pan sprays, room fresheners and household insecticides; industrial products such as cleaners, lubricants and mold release agents; and automotive products such as cleaners and polishers. All such products utilize the pressure of a propellant gas or a mixture of propellant gases (i.e., a propellant gas system) to expel the active ingredients from the container. For this purpose, most aerosols employ liquified gases which vaporize and provide the pressure to propel the active ingredients when the valve on the aerosol container is pressed open.

An important physical property associated with the dispensing of aerosol products is the vapor pressure of the propellant. Vapor pressure from the viewpoint of this invention is the pressure exerted when a liquified propellant gas is in equilibrium with its vapor in a closed container, such as an aerosol can. Vapor pressure can be measured by connecting a pressure gauge to the valve on an aerosol can or gas cylinder containing the vapor/liquid mixture. A standard of measurement of vapor pressure in the U.S. aerosol industry is pounds per square inch gauge (psig) with the gas/liquid mixture at constant temperature, most commonly at 70° F. (21° C.). The vapor pressure of liquified gases most widely employed as aerosol propellants will vary over the range of about 20 to 90 psig (138 to 621 kPa) at 70° F. (21° C.). The propellant systems of the present invention have vapor pressures in this range.

In the early 1970s, concern began to be expressed that the stratospheric ozone layer (which provides protection against penetration of the earth's atmosphere by ultraviolet radiation) was being depleted by chlorine atoms introduced to the atmosphere from the release of fully halogenated chlorofluorocarbons. These chlorofluorocarbons are used as propellants in aerosols, as blowing agents for foams, as refrigerants and as cleaning/drying solvent systems. Because of the great chemical stability of fully halogenated chlorofluorocarbons, according to the ozone depletion theory, these compounds do not decompose the earth's atmosphere but reach the stratosphere where they slowly degrade liberating chlorine atoms which in turn react with the ozone.

Concern reached such a level that in 1978 the U.S. Environmental Protection Agency (EPA) placed a ban on nonessential uses of fully halogenated chlorofluorocarbons as aerosol propellants. This ban resulted in a dramatic shift in the U.S. away from chlorofluorocarbon propellants (except for exempted uses) to primarily hydrocarbon propellants. However, since the rest of the world did not join the U.S. in this aerosol ban, the net result has been to shift the uses of chlorofluorocarbons in aerosols out of the U.S., but not to permanently reduce the world-wide total chlorofluorocarbon production, as sought. In fact, in the last few years the total amount of chlorofluorocarbons manufactured worldwide has exceeded the level produced in 1978 (before the U.S. ban).

During the period of 1978-1987, much research was conducted to study the ozone depletion theory. Because of the complexity of atmospheric chemistry, many questions relating to this theory remain unanswered. However, assuming the theory to be valid, the health risks which would result from depletion of the ozone layer are significant. This, coupled with the fact that worldwide production of chlorofluorocarbons has increased, has resulted in international efforts to reduce chlorofluorocarbon use. Particularly, in September, 1987, the United Nations through its Environment Programme (UNEP) issued a tentative proposal calling for a 50 percent reduction in world-wide production of fully halogenated chlorofluorocarbons by the year 1998. This proposal was ratified Jan. 1, 1989 and became effective on Jul. 1, 1989.

Because of this proposed reduction in availability of fully halogenated chlorofluorocarbons such as CFC-11, CFC 12 and CFC-113, alternatively more environmentally acceptable products are urgently needed.

As early as the 1970s with the initial emergence of the ozone depletion theory, it was known that the introduction of hydrogen into previously fully halogenated chlorofluorocarbons markedly reduced the chemical stability of these compounds. Hence, these now destabilized compounds would be expected to degrade in the atmosphere and not reach the stratosphere and the ozone layer. The following Table I lists the ozone depletion potential for a variety of fully and partially halogenated halocarbons. Halocarbon Global Warming Potential data (potential for reflecting infrared radiation (heat) back to earth and thereby raising the earth's surface temperature) are also shown.

TABLE I

Ozone Depletion and Halocarbon Global Warming Potentials

| Blowing Agent | Ozone Depletion Potential | Halocarbon Global Warming Potential |
|---|---|---|
| CFC-11 ($CFCl_3$) | 1.0 | 1.0 |
| CFC-12 ($CF_2Cl_2$) | 1.0 | 2.8 |
| HCFC-22 ($CHF_2Cl$) | 0.05 | 0.3 |
| HCFC-123 ($CF_3CHCl_2$) | 0.02 | 0.02 |
| HCFC-124 ($CF_3CHFCl$) | 0.02 | 0.09 |
| HFC-134a ($CF_3CH_2F$) | 0 | 0.3 |
| HCFC-141b ($CFCl_2CH_3$) | 0.1 | 0.09 |
| HCFC-142b ($CF_2ClCH_3$) | 0.06 | 0.3 |
| HFC-152a ($CHF_2CH_3$) | 0 | 0.03 |
| CFC-113 ($CF_2Cl$—$CFCl_2$) | 0.8–0.9 | 1.4 |

Halocarbons such as HFC-134a have zero ozone depletion potential. Dimethyl ether, having no halogen content, is also a zero ozone depleter.

Although 1,1,1,2-tetrafluoroethane has utility as a refrigerant, aerosol propellant or foam blowing agent, an azeotrope offers the possibility of producing more economical nonfractionating systems with improved properties such as polymer and refrigerant oil solubility.

Unfortunately, as recognized in the art, it is not possible to predict the formation of azeotropes.

This fact obviously complicates the search for new azeotropes which have application in the field. Nevertheless, there is a constant effort in the art to discover new azeotropic compositions, which have desirable characteristics.

SUMMARY OF THE INVENTION

The present invention is directed to substantially constant boiling blowing agent compositions consisting essentially of 40–99 weight percent, usually 40–95 weight percent, 1,1,1,2-tetrafluoroethane (HFC-134a) and 1–60 weight percent, usually 5–60 weight percent, dimethyl ether (DME). Generally, the blowing agent compositions consist essentially of 50–99 weight percent, usually 70–99 weight percent, 1,1,1,2-tetrafluoroethane and 1–50 weight percent, usually 1–30 weight percent, dimethyl ether. Preferred blowing agent compositions consist essentially of 85–99 weight percent 1,1,1,2-tetrafluoroethane and 1–15 weight percent dimethyl ether.

Preferred blowing agent compositions nonflammable at ambient temperature consist essentially of 90–99 weight percent 1,1,1,2-tetrafluoroethane and 1–10 weight percent dimethyl ether. The substantially constant boiling azeotropic blowing agent composition consists essentially of about 45–55 weight percent 1,1,1,2-tetrafluoroethane and 45–55 weight percent dimethyl ether. The specific azeotropic composition contains 50 weight percent 1,1,1,2-tetrafluoroethane and 50 weight percent dimethyl ether ($\pm 5$ weight percent) with a boiling temperature of about $-23°$ C. at about atmospheric pressure.

By substantially constant boiling composition as used in the present invention means the initial vapor pressure of the composition at 25° C. does not change by more than 2% after half of the initial mixture has been allowed to evaporate. Thus, the compositions described herein resist component segregation and change in vapor pressure which would seriously diminish their usefulness in the contemplated application.

In addition, studies have further shown that the novel substantially constant boiling composition of the present invention exhibits dew and bubble point pressures with small pressure differentials of less than about 2%. As is well known in this technology, small differences between the dew point pressure and the bubble point pressure at the same temperature is a further indication of the substantially constant boiling or azeotrope-like behavior of the mixtures.

Azeotropic or substantially constant boiling is intended to s mean also essentially azeotropic or essentially constant boiling. In other words, included within the meaning of these terms are not only the true azeotrope described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which not only will exhibit essentially equivalent properties for use as blowing agents, but which will also exhibit essentially equivalent properties to the true azeotropic composition in terms of constant boiling characteristics or tendency not to separate or fractionate on boiling.

The substantially constant boiling compositions of the invention are useful as blowing agents. They have zero ozone depletion potential opposite CFC-12, which is rated at 1.0. The compositions of this invention are especially suitable as blowing agents because 1,1,1,2-tetrafluoroethane reduces the solvency or plasticizing effect of dimethyl ether and the dimethyl ether solubilizes 1,1,1,2-tetrafluoroethane in the polymer foam. This balancing of solubility makes 1,1,1,2-tetrafluoroethane and dimethyl ether particularly useful as foam blowing agents.

DESCRIPTION OF PREFERRED EMBODIMENTS

Mixtures of HFC-134a and DME may be formulated such that they are nonflammable. Therefore, also included among the compositions of this invention are compositions nonflammable at ambient temperature containing I to 10 weight percent DME and 90 to 99 weight percent HFC-134a that are especially effective blowing agents. Also, compositions containing 70–99 weight percent 1,1,1,2-tetrafluoroethane and 1–30 weight percent dimethyl ether are especially useful as blowing agents because they have excellent insulating values.

The HFC-134a/DME azeotropic and substantially constant boiling azeotrope-like compositions are excellent polymer blowing agents. The dimethyl ether component unexpectedly solubilizes the poorly soluble HFC-134a in polyurethane, phenolic and polystyrene foam, resulting in excellent insulating foams. Once solubilized in the foam, the HFC-134a insulating gas does not diffuse out of the foam.

The novel substantially constant boiling compositions of the invention were discovered during a phase study wherein the compositions were varied and vapor pressures measured. The azeotropic composition at 22° C. occurred at the minimum point of the vapor pressure-concentration plot, being at 50 weight percent HFC-134a and 50 weight percent DME (±5 weight percent). The azeotrope has an atmospheric pressure boiling point of about −23° C., compared with −26.5° C. for HFC-134a and −24.6° C. for DME.

The language "an azeotrope composition consisting essentially of . . . " is intended to include mixtures which contain all the components of the azeotrope of this invention (in any amounts) and which, when fractionally distilled, would produce an azeotrope containing all the components of this invention in at least one fraction, alone or in combination with another compound, e.g., one which distills at substantially the same temperature as o said fraction.

The nonflammable blowing agents of this invention (at ambient temperature) consist essentially of effective amounts of HFC-134a and DME within the range of about 90 to 99 weight percent of HFC-134a and 1 to 10 weight percent of DME. Usually, for purposes of the invention, the blowing agents will contain from about 40 to 99 weight percent of HFC-134a, the remainder being DME.

As stated above, the preferred binary 1,1,1,2-tetrafluoroethane/DME compositions are essentially nonflammable. By nonflammable is meant a gas mixture which in air will not burn when subjected to a spark igniter as described in "Limits of Flammability of Gases and Vapors", Bulletin 503, H. F. Coward et al., Washington, U.S. Bureau of Mines, 1952.

The HFC-134a/dimethyl ether azeotrope of the invention has a vapor pressure at 70° F. (21° C.) of about 58 psig (400 kPa). This pressure range makes the azeotrope attractive and useful as an aerosol propellant.

The HFC-134a/dimethyl ether azeotrope has been determined to be a good solvent for polystyrene. Thus, the azeotrope and, more particularly, the nonflammable mixtures of HFC-134a and dimethyl ether are excellent blowing agents for polystyrene and will make it possible to solubilize HFC-134a in polystyrene.

Additionally, the HFC-134a/dimethyl ether azeotrope is soluble in polyurethane polyols; whereas, HFC-134a alone has quite poor solubility.

The composition of the instant invention can be prepared by any convenient method including mixing or combining, by suitable methods, the desired amounts of the components, using techniques well-known to the art.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following Examples, all temperatures are set forth uncorrected in degrees Celsius and unless otherwise indicated, all parts and percentages are by weight.

EXAMPLE 1

A phase study is made on 1,1,1,2-tetrafluoroethane and dimethyl ether wherein the composition is varied and the vapor pressures measured at a temperature of 22° C. An azeotropic composition is obtained as evidenced by the minimum vapor pressure observed and is identified as 50 weight percent 1,1,1,2-tetrafluoroethane and 50 weight percent dimethyl ether (±5 weight percent).

EXAMPLE 2

Phase studies were made on the substantially constant boiling compositions of 1,1,1,2-tetrafluoroethane (HFC-134a) and dimethyl ether (DME) to verify minimal fractionation and change in vapor pressure during a vapor phase loss of 50% of the compositions at 25° C., about room temperature. Initial liquid composition (IQ), final liquid composition (FQ), initial vapor pressure, and change in vapor pressure from initial vapor pressure were all studied to determine the effects of vapor pressure as illustrated in Table II.

TABLE II

| Sample | Percent Loss of Mixture | Wt. % Composition HFC-134a | DME | Vapor Pressure (psia) | Vapor Pressure Change (%) |
|---|---|---|---|---|---|
| IQ | 0 | 99 | 1 | 97.4 | |
| FQ | 50 | 98.7 | 1.3 | 97.2 | 0.2 |
| IQ | 0 | 95 | 5 | 94.4 | |
| FQ | 50 | 93.7 | 6.3 | 93.6 | 0.8 |
| IQ | 0 | 90 | 10 | 91.3 | |
| FQ | 50 | 87.8 | 12.2 | 90.1 | 1.2 |
| IQ | 0 | 80 | 20 | 86.7 | |
| FQ | 50 | 77.3 | 22.7 | 85.8 | 1.0 |
| IQ | 0 | 70 | 30 | 84.1 | |
| FQ | 50 | 67.7 | 32.3 | 83.7 | 0.5 |
| IQ | 0 | 60 | 40 | 82.7 | |
| FQ | 50 | 58.7 | 41.3 | 82.7 | 0.0 |
| IQ | 0 | 50 | 50 | 82.4 | |
| FQ | 50 | 49.9 | 50.1 | 82.4 | 0.0 |
| IQ | 0 | 40 | 60 | 82.6 | |
| FQ | 50 | 41.0 | 59 | 82.5 | 0.1 |

The data in Table II indicate that the mixtures of HFC-134a and DME are substantially constant boiling with only a maximum change of 1.2% in the vapor pressure at 25° C. with 50% of the initial mixture evaporated.

EXAMPLE 3

The difference between the dew point and the bubble point pressures of the compositions of the present invention are very small when compared with known non-azeotropic compositions, namely (50+50) weight percent mixtures of pentafluoroethane (HFC-125) and 1,1,1,2-tetrafluoroethane (HFC-134a) and chlorodifluoromethane (HCFC-22) and 1-chloro-1,1-difluoroethane (HCFC-142b), respectively. The following data in Table III confirm the constant boiling behavior of the compositions described herein.

TABLE III

| Refrigerant Composition (Weight Percent) | | Pressures (psia) at 0° C. | | |
|---|---|---|---|---|
| | | Bubble Point Pressure | Dew Point Pressure | DP* (psia) |
| HFC-134a | + DME | | | |
| 100 | 0 | 43.04 | 43.04 | 0 |
| 99 | 1 | 42.69 | 42.48 | 0.21 |
| 95 | 5 | 41.37 | 40.73 | 0.64 |
| 90 | 10 | 39.99 | 39.26 | 0.73 |
| 80 | 20 | 38.06 | 37.61 | 0.45 |

TABLE III-continued

| Refrigerant Composition (Weight Percent) | | Pressures (psia) at 0° C. | | DP* (psia) |
| --- | --- | --- | --- | --- |
| | | Bubble Point Pressure | Dew Point Pressure | |
| 70 | 30 | 36.99 | 36.84 | 0.15 |
| 60 | 40 | 36.55 | 36.54 | 0.01 |
| 50 | 50 | 36.53 | 36.52 | 0.01 |
| 40 | 60 | 36.77 | 36.70 | 0.07 |
| HFC-125 + HFC-134a (50 + 50) | | 68.7 | 58.3 | 10.4 |
| HCFC-22 + HCFC-142b (50 + 50) | | 44.1 | 31.2 | 12.9 |

*DP is difference in pressure between the dew point and bubble point pressures.

The small difference in pressure between the dew point pressure and the bubble point pressure at 0° C. for the mixture of HFC-134a and DME indicates that the compositions have insignificant fractionation and behave as a single compound with a substantially constant boiling point.

EXAMPLE 4

An aerosol room freshener was prepared with the HFC-134a/dimethyl ether azeotrope. The formulation and vapor pressure are shown in Table IV.

TABLE IV

| Aerosol Room Freshener Formulation | |
| --- | --- |
| Ingredient | Wt. % |
| Perfume | 2.0 |
| HFC-134a/Dimethyl ether (46/54) | 98.0 |
| Vapor Pressure at 70° F., psig | 60.5 |
| (at 21° C., kPa) | (417) |

EXAMPLE 5

The solubility of the HFC-134a/dimethyl ether azeotrope is determined in a polyurethane polyol. The azeotrope is readily soluble at 30.0 weight percent; whereas, HFC-134a is insoluble. The solubility data are summarized in Table V.

TABLE V

| Solubility of HFC-134a/Dimethyl Ether Azeotrope in Polyol | | |
| --- | --- | --- |
| Blowing Agent | Wt. % in Polyol* | Appearance |
| HFC134a | 30.0 | Insoluble, two phases |
| HFC-134a/Dimethyl ether (46/54) | 30.0 | Soluble, single phase |

*Stepanol ® PS-2852 (Stepan Company) an aromatic polyester polyol.

EXAMPLE 6

The solubility of the HFC-134a/dimethyl ether azeotrope in polystyrene is determined by combining a piece of polystyrene (about 2.5 cm long, 0.5 cm wide and 0.5 cm thick) with about 50 g azeotrope. Whereas HFC-134a has essentially no solvency in polystyrene, the HFC-134a/dimethyl ether azeotrope softens and deforms the polystyrene. The data are summarized in Table VI.

TABLE VI

| Solubility of HFC-134a/Dimethyl Ether Azeotrope in Polystyrene | |
| --- | --- |
| Blowing Agent | Appearance of Polystyrene |
| HFC-134a | No effect |
| HFC-134a/Dimethyl Ether (46/54) | Polystyrene softened and |

TABLE VI-continued

| Solubility of HFC-134a/Dimethyl Ether Azeotrope in Polystyrene | |
| --- | --- |
| Blowing Agent | Appearance of Polystyrene |
| | deformed* |

*On removing the polystyrene from the azeotrope, expansion occurs from solubilized HFC-134a.

EXAMPLES 7–10

The solubility of substantially constant boiling blowing agent compositions of HFC-134a/DME in the amounts given below was determined in a polyisocyanurate having an isocyanate index of 250±50 and the K-factor of the foams was measured.

TABLE VII

| Blowing Agent | Wt. % of Blowing Agent in Foam | K-factor (BTU-in/hr-ft² °F.) |
| --- | --- | --- |
| HFC-134a/DME (90/10) | 8.9 | 0.165 |
| HFC-134a/DME (80/20) | 7.2 | 0.166 |
| HFC-134a/DME (70/30) | 7.7 | 0.171 |
| HFC-134a/DME (50/50) | 6.0 | 0.174 |

These examples show that the insulating value (K-factor) is substantially independent of the quantity of dimethyl ether in the blowing agent compositions. A polyurethane foam made with an equivalent amount of a CFC-11 blowing agent content (about 10.3 weight percent) would have a K-factor of about 0.14.

EXAMPLE 11

The quantity of HFC-134a required in the vapor space above blends of HFC-134a and dimethyl ether for nonflammability is determined. The test conditions and results are summarized in Table VIII

TABLE VIII

| Nonflammable Blend of HFC-134a/Dimethyl Ether Ignition Source: 3-mil copper exploding wire (110 volts) | | |
| --- | --- | --- |
| Temperature: | 80° C. | 150° C. |
| Quantity of HFC-134a required for nonflammability* | greater than 91.% | greater than 98.% |

*In HFC-134a/dimethyl ether vapor mixtures in air.

Data in Table VIII indicate an effect of test temperature on the amount of HFCo 134a required for nonflammability. This indicates that a concentration of dimethyl ether higher than 9% could be present in a nonflammable composition at ambient temperature (about 25° C.).

The preceding Examples can be repeated with similar success by substituting the generically or specifically described reactants and/or operating conditions of this invention for those used in the preceding Examples.

From the foregoing description, one skilled in the art can easily ascertain the essential characteristics, spirit and scope thereof, can make various changes and modifications of the invention to adapt it to various usages and conditions.

We claim:

1. A process for preparing a polymer foam comprising providing a blowing agent wherein the blowing agent consists essentially of about 91–99 weight percent 1,1,1,2-tetrafluoroethane and about 1–9 weight percent dimethyl ether combining the blowing agent with the polymer or a polyol thereof solubilizing the blowing agent in said polymer or polyol; and recovering the polymer foam wherein said foam comprises at least one of polyurethane, phenolic and polystyrene.

2. In a process for preparing a polymer foam comprising utilizing a blowing agent to expand the polymer, the improvement wherein the blowing agent is nonflammable at ambient temperatures and consists essentially of 91–99 weight percent 1,1,1,2-tetrafluoroethane and 1–9 weight percent dimethyl ether; wherein the polymer comprises at least one foam selected from polyurethane, phenolic and polystyrene.

3. In a process for preparing a polymer foam comprising utilizing a blowing agent to expand the polymer, the improvement wherein the blowing agent is a substantially constant boiling composition consisting essentially of 45–55 weight percent 1,1,1,2-tetrafluoroethane and 45–55 weight percent dimethyl ether, said composition having a boiling point of about $-23°$ C. at about atmospheric pressure.

4. An aerosol composition comprising active ingredients and a propellant, the improvement wherein the propellant is a substantially constant boiling composition comprising about 45–55 weight percent 1,1,1,2-tetrafluoroethane and about 55–45 weight percent dimethyl ether, wherein the substantially constant boiling composition has a boiling point of about $-23°$ C. at about atmospheric pressure.

* * * * *